Nov. 13, 1934.                B. D. BEDFORD                1,980,899
                      ALTERNATING CURRENT GENERATOR
                          Filed Jan. 28, 1931
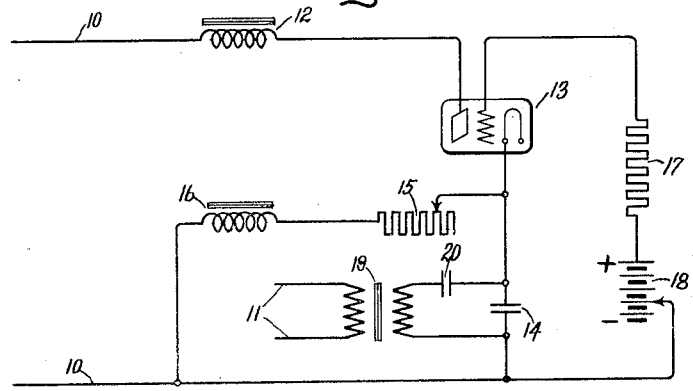
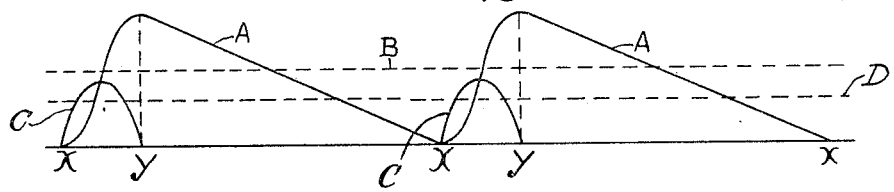
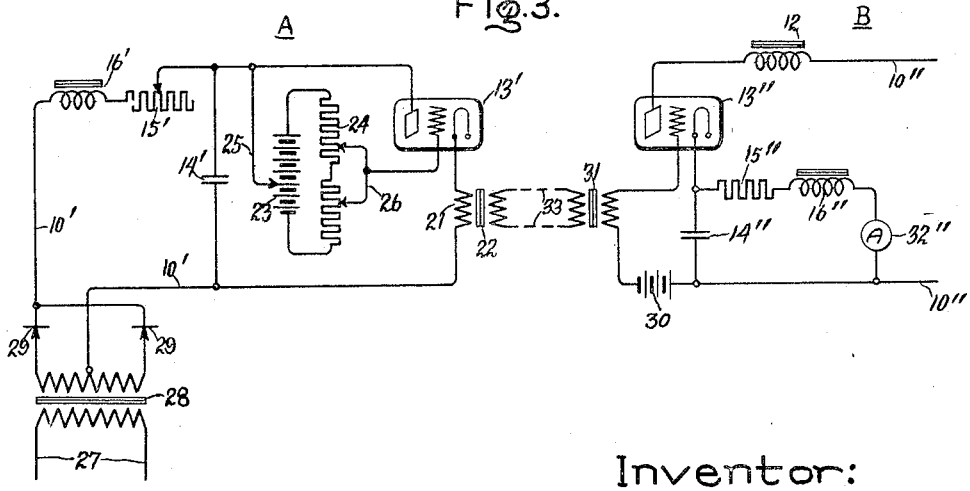
Inventor:
Burnice D. Bedford,
by Charles V. Mullen
His Attorney.

Patented Nov. 13, 1934

1,980,899

UNITED STATES PATENT OFFICE 1,980,899

ALTERNATING CURRENT GENERATOR

Burnice D. Bedford, Schenectady, N. Y., assignor to General Electric Company, a corporation of New York Application January 28, 1931, Serial No. 511,915

10 Claims. (Cl. 250—36)

My invention relates to electric circuits for generating periodic currents and more particularly to such circuits including electric valves for generating periodic currents variable in frequency over a wide range.

Heretofore numerous arrangements have been devised for generating periodic currents by means of electric circuits including electric valves. Certain of these arrangements utilizing electric valves of the pure electron discharge type have the disadvantage that only limited power output may be obtained at ordinary operating voltages. Other arrangements utilizing vapor electric valves have the disadvantage of unsatisfactory operation over wide variations in frequency of the periodic current. The present invention constitutes an improvement over those disclosed and claimed in the copending application of Franklin and Cutler Serial No. 511,810 filed January 28, 1931 and assigned to the same assignee as the present application and in Patent No. 1,859,082 granted May 17, 1932, upon the application of A. S. FitzGerald, et al. In that application and that patent there are disclosed arrangements including a single electric valve for generating a periodic current varying in frequency over a wide range.

It is an object of my invention to provide an improved electric circuit including a single electric valve which will overcome the above mentioned disadvantages of the arrangements of the prior art and which will be simple and reliable in operation.

It is a further object of my invention to provide an electric circuit including a single electric valve for generating a periodic current variable in frequency over a wide range.

In accordance with my invention I provide a capacitor having a charging circuit and a discharging circuit. One of these circuits is oscillatory and includes an electric valve, while the other circuit is non-oscillatory and includes a variable resistance, which is one of the elements by means of which the frequency of the generated periodic current may be controlled. A grid circuit is provided for the electric valve responsive to the charge on the capacitor so that the valve may be maintained nonconducting whenever current is flowing in the non-oscillatory circuit. The frequency of the periodic current generated by the circuit can be easily controlled over a wide range by proper variation of the resistance in the non-oscillatory circuit or by variations of the bias in the grid circuit of the electric valve.

In accordance with another feature of my invention my improved circuit for generating a periodic current is utilized in a telemetering system by means of which the value of an electrical quantity may be indicated at a remote point. In this arrangement my improved circuit for generating a periodic current is utilized at the transmitting station to generate a periodic current which varies in accordance with the value of the electrical quantity to be measured. This periodic current is transmitted to a receiving station in which a slightly modified form of my circuit for generating a periodic current is utilized to generate a current the frequency of which is determined by the frequency of the current generated by the first circuit, while the average value of the unidirectional periodic current generated by the second circuit has a value depending upon its frequency. By indicating the average value of the current generated by this last circuit, there is obtained an indication of the value of the electrical quantity at the transmitting station.

For a better understanding of my invention together with other further objects thereof, reference is had to the accompanying drawing and its scope will be pointed out in the appended claims. In the drawing, Fig. 1 is a diagrammatic representation of my invention for generating a periodic current of variable frequency; Fig. 2 is a diagram showing certain operating characteristics of the arrangement illustrated in Fig. 1, and Fig. 3 shows my improved circuit for generating periodic current as applied to a system of telemetering.

Referring now to Fig. 1 of the drawing, I have illustrated an arrangement for receiving direct or alternating current from the circuit 10 and converting it into periodic current of variable frequency and transmitting it to the receiving circuit 11. This apparatus comprises a reactor 12, an electric valve 13 and a capacitor 14, serially connected across the circuit 10, and a variable resistor 15 and reactor 16 connected in parallel to the capacitor 14. The electric valve 13 is provided with an anode, a cathode and a control grid, and may be of any of the several types well known in the art, although I prefer to use a valve of the vapor electric discharge type in which the current through the valve is controlled by the potential on the grid but in which the current flowing in the valve can be interrupted only by reducing the anode potential below its critical value. The grid of the electric valve 13 is connected to that terminal of the capacitor 14 which is connected to the direct current source 10. This grid circuit may include the current limiting resistor 17 and an adjustable positive bias battery 18, although for valves with certain characteristics, or for certain desired operation of the arrangement, the battery 18 may be omitted. Although the receiving circuit 11 may be connected across any portion of the charging or discharging circuits, I prefer to connect it across the capacitor 14 through a transformer 19 and a capacitor 20 for preventing any direct current from flowing in the primary winding of the transformer 19.

In explaining the operation of the above described apparatus it will be assumed that the circuit 10 is initially deenergized. In this case the grid of the electric valve 13 will be positive with respect to its cathode, the grid circuit being completed through the resistor 17, positive bias battery 18, the reactor 16 and the resistor 15, so that, as soon as the source 10 is energized, the valve 13 is conductive to supply charging current to the capacitor 14. To aid in the understanding of the operation of this apparatus reference is had to Fig. 2 in which the curve A represents the potential across the capacitor 14, the curve B the potential of the source 10 and the curve C the charging current of the capacitor 14. The portion $x-y$ of the curve A represents the potential of the capacitor 14 during the charging portion of the cycle of periodic current. Because of the inductance of the reactor 12, which makes the charging circuit oscillatory, the capacitor is charged to approximately twice the potential of the source 10 as shown in Fig. 2. As soon as the energy of the reactor 12 has all been transferred to capacitor 14 the current is instantly interrupted in the valve 13 since the potential of the capacitor 14 in the series circuit made up of the charging circuit and the source 10 is such as to make the anode of the valve 13 negative with respect to its cathode. The capacitor 14 will now begin to discharge slowly through the resistor 15 and the reactor 16, this discharge being represented by the portion $y-x$ of the curve A in Fig. 2. It will be apparent that the rate of discharge of the capacitor 14 and, thus, the frequency of the periodic current may be readily determined by properly adjusting the setting of the resistor 15. In case it is desired to generate a very low frequency so that the resistance of the resistor 15 is very high, the reactor 16 may be omitted, but for higher frequencies the reactor 16 will be necessary to limit the current which builds up in the discharge circuit during the charging of the capacitor 14, while the electric valve 13 is conducting, to a value below that required to maintain a discharge in the valve 13. It is only necessary that the combined impedance of the resistor 15 and reactor 16 is sufficient to limit the current through the valve 13 to some value below that required to maintain a discharge in the valve at the end of the time interval required to charge the capacitor 14. In the foregoing explanation it has been assumed that the bias battery 18 has either been omitted or set to such a value that the valve 13 will be rendered conducting when the capacitor 14 has been completely discharged. However, it will be obvious that, by properly adjusting this variable positive bias in the grid circuit of the valve 13, the valve may be rendered conducting at some point intermediate the point $y$ and $x$ so that the capacitor will be recharged from the source 10 before it becomes completely discharged. Obviously this will increase the frequency of the periodic potential appearing at the terminals of the capacitor 14, that is, the frequency of the potential delivered to the receiving circuit 11 may be varied by adjusting either the resistor 15 or the bias battery 18, or by a combination of these two operations.

In Fig. 3 I have shown a slight modification of the apparatus described in connection with Fig. 1, as applied to a telemetering system. Before describing the system as a whole, the differences between the circuits for generating periodic currents and the circuit in Fig. 1 will first be pointed out. The arrangement of circuit A is similar to that of Fig. 1 except that the charging and discharging circuits are interchanged, that is, the charging circuit is non-oscillatory and the discharging circuit is preferably oscillatory. In this arrangement the grid of the valve 13' has been connected to that terminal of the capacitor connected to the anode of the valve rather than that connected to the cathode and the adjustable bias battery 18 has been replaced by a battery 23 and potentiometer 24 provided with adjustable connections 25 and 26. With this arrangement it has been found that a very sensitive control of the potential of the grid of the valve 13' may be obtained. In this arrangement the circuit 10' is shown as energized from an alternating current source 27 through the transformer 28 and rectifiers 29, which may be of any of the several types well known in the art. The operation of this arrangement is exactly similar to that described in connection with Fig. 1, and the curves in Fig. 2 represent its operating characteristics if the time axis is reversed and the line D is taken as the potential axis; that is, the capacitor 14' is slowly charged to a predetermined potential after which the valve 13' is made conducting, and then there is an oscillatory discharge through the valve 13' and primary winding 21 of the transformer 22 which charges the capacitor 14' to an opposite potential approximately equal to that to which it was charged by its source. As before, the frequency of the variable potential across the capacitor 14' may be controlled by adjusting the setting of the resistor 15' or the connections 25 and 26 of the bias battery-potentiometer arrangement, or by a combination of these two adjustments. Since in the arrangement of circuit A there is no valve interposed between the capacitor 14' and the circuit 10', the rectifier 29 must be used if the source of energy is an alternating current.

The arrangement of circuit B is the same as that of Fig. 1 with the exception of the grid circuit of the valve 13'' which comprises the capacitor 14'', the negative bias battery 30, and the secondary winding of the transformer 31, the primary winding of which is energized by the current impulses transmitted from the circuit A. A direct current meter 32 is interposed in the discharge circuit of the capacitor 14'' to indicate the average current flowing in this discharge circuit. The operation of this arrangement is exactly similar to that of Fig. 1 with the exception that the frequency is controlled by the frequency of the current impulses delivered to the grid of the valve 13'' by the transformer 31. In case this frequency is less than the natural frequency of the circuit as described in connection with Fig. 1, there will be a time interval between the successive cycles of the periodic potential appearing across the capacitor 14'', while if the frequency of the circuit A is above that of the circuit B, the discharge of the capacitor 14'' of circuit B will be interrupted at some point between $y$ and $x$, but in either case the average current flowing in the discharge circuit, which is that represented by the curve C of Fig. 2, will vary directly with the frequency of the periodic current of the circuit B which, in turn will, depend upon the frequency of circuit A.

The operation of the arrangement of Fig. 3 of the telemetering system will now be readily understood. The rate of charge of the capacitor 14' and hence the frequency of the periodic current generated by the circuit A will be directly proportional to the potential of the circuit 10'. If the electrical quantity to be measured is a direct potential, obviously it may be impressed upon the circuit 10' directly. If the quantity to be measured is a direct current it may be passed through a resistor or a potentiometer and the circuit 10' energized across this resistor so that the frequency of the circuit A will be determined by the current flowing in the resistor. If the quantity to be measured is an alternating quantity, such as potential or current, it may be passed through a potential or series transformer and then rectified before impressing upon the circuit 10'. By various other expedients well known to those skilled in the art, it is thus seen that the frequency of the periodic current generated by the circuit A may be made proportional to practically any electrical quantity. It will be observed that the transmitting circuit 33 is connected in the discharge circuit of the capacitor 14' through the series transformer 22, so that the transmitting circuit receives only the current impulses C of Fig. 2. These impulses, transmitted over the circuit 33, are impressed upon the grid of the valve 13" of circuit B by means of the transformer 31 and control the frequency of the periodic current generated by this circuit as explained above. The direct current meter 32, which indicates the average value of the discharge current of the capacitor 14" which, in turn, is dependent upon its frequency, will indicate the reading of the electrical quantity by means of which the circuit 10 of circuit A is energized.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. Apparatus for generating a periodic current comprising a source of current, a capacitor, a circuit for charging said capacitor from said source of current, a discharging circuit for said capacitor, one of said circuits being oscillatory and including in series relation an electric valve, and the other being non-oscillatory and including a relatively high resistance, and means for maintaining said valve non-conducting during the flow of capacitor current in the non-oscillatory circuit.

2. Apparatus for generating a periodic current of variable frequency comprising a source of current, a capacitor, a circuit for charging said capacitor from said source of current, a discharging circuit for said capacitor, one of said circuits being oscillatory and including the anode and cathode of an electric valve provided with a control grid, and the other being non-oscillatory and including a relatively high resistance, means for rendering said valve non-conducting during the flow of capacitor current in the non-oscillatory circuit, and a source of variable grid bias potential for varying the frequency of the generated current.

3. Apparatus for generating a periodic current comprising a source of current, a capacitor, a circuit for charging said capacitor from said source of current, a discharging circuit for said capacitor, one of said circuits being oscillatory and including in series relation an electric valve and the other being non-oscillatory and including a relatively high resistance, and means responsive to the potential of said capacitor for controlling the conductivity of said valve.

4. Apparatus for generating a periodic current comprising a source of current, a capacitor, a circuit for charging said capacitor from said source of potential, a discharging circuit for said capacitor, one of said circuits being oscillatory and including in series relation an electric valve provided with a pair of main electrodes and a control grid, and the other circuit being non-oscillatory and including a relatively high resistance, a connection between one of said main electrodes and a terminal of said capacitor, and a connection between said control grid and the other terminal of said capacitor for controlling the conductivity of said valve.

5. Apparatus for generating a periodic current comprising a source of current, a series circuit connected across said source including an inductance, an electric valve and a capacitor, said valve being provided with a pair of main electrodes and a control grid, a circuit connected in parallel to said capacitor including a relatively high resistance, and a connection between said control grid and the remote capacitor terminal, whereby said valve is rendered conducting to charge said capacitor when it becomes discharged to a predetermined potential.

6. Apparatus for generating a periodic current of variable frequency comprising a source of current, a series circuit connected across said source including an inductance, an electric valve and a capacitor, said valve being provided with a pair of main electrodes and a control grid, a circuit connected in parallel to said capacitor including a variable resistance, and a connection between said control grid and the remote capacitor terminal including a source of variable bias potential, whereby said valve is rendered conducting to charge said capacitor when it becomes discharged to a predetermined potential.

7. Apparatus for generating a periodic current comprising a source of current, a circuit connected across said source including a capacitor and a resistance, a circuit connected in parallel to said capacitor including an inductance in series with the anode and cathode of an electric valve provided with a control grid, the anode of said valve being connected to a terminal of said capacitor, and a connection between said control grid and the terminal of said capacitor connected to said anode including a source of negative bias potential, whereby said valve is rendered conducting to discharge said capacitor when it becomes charged to a predetermined potential.

8. Apparatus for generating a periodic current whose frequency is determined by that of an electric signal comprising a source of current, a capacitor, a circuit for charging said capacitor from said source of potential, a discharging circuit for said capacitor, one of said circuits being oscillatory and including the anode and cathode of an electric valve provided with a control grid, the other of said circuits being non-oscillatory and including a relatively high variable resistance, and means for exciting said control grid with said electric signal.

9. Apparatus for generating a periodic current of a predetermined frequency comprising a source of current, a capacitor, a circuit for charging said capacitor from said source, a circuit for discharging said capacitor, an electric valve included in series with one of said circuits, a source of periodic potential of said predetermined frequency, and means for controlling said valve in accordance with the charge of said capacitor and said periodic potential to render said valve periodically conductive at said predetermined frequency.

10. Apparatus for generating periodic current of a predetermined frequency comprising a source of current, a capacitor, a circuit for charging said capacitor from said source, a circuit for discharging said capacitor, an electric valve having an anode and a cathode included in only one of said circuits, said valve being provided with a control electrode, a source of periodic potential of said predetermined frequency, and means for rendering said valve periodically conductive at said predetermined frequency comprising an exciting circuit for said control electrode including said source of periodic potential and said capacitor.

BURNICE D. BEDFORD.